(12) United States Patent
Takase et al.

(10) Patent No.: US 10,576,983 B2
(45) Date of Patent: Mar. 3, 2020

(54) VEHICLE SYSTEM

(71) Applicant: MAZDA MOTOR CORPORATION, Hiroshima (JP)

(72) Inventors: Masaru Takase, Hiroshima (JP); Ryohei Yasutomi, Hiroshima (JP); Hisanobu Okada, Hiroshima (JP); Setsuya Kishimura, Hiroshima (JP); Takeshi Yabuki, Hiroshima (JP); Keishi Taki, Hiroshima (JP); Seiyo Hirano, Hiroshima (JP); Akitomo Kume, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/107,332

(22) Filed: Aug. 21, 2018

(65) Prior Publication Data

US 2019/0071089 A1 Mar. 7, 2019

(30) Foreign Application Priority Data

Sep. 1, 2017 (JP) .................................. 2017-168663

(51) Int. Cl.
B60W 30/18 (2012.01)
B60W 10/06 (2006.01)
B60W 10/188 (2012.01)

(52) U.S. Cl.
CPC ...... *B60W 30/18109* (2013.01); *B60W 10/06* (2013.01); *B60W 10/188* (2013.01); *B60W 2540/12* (2013.01)

(58) Field of Classification Search
None
See application file for complete search history.

(56) References Cited

U.S. PATENT DOCUMENTS

2014/0243152 A1* 8/2014 Gibson ............... B60W 10/06
477/185
2016/0023660 A1* 1/2016 Yu ........................... B60T 7/122
477/188

FOREIGN PATENT DOCUMENTS

JP 2009-190648 A 8/2009
JP 2012-046182 A 3/2012

OTHER PUBLICATIONS

An Office Action mailed by the Japanese Patent Office dated Apr. 15, 2019, which corresponds to Japanese Patent Application No. 2017-168663 and is related to U.S. Appl. No. 16/107,332.

* cited by examiner

*Primary Examiner* — Dale W Hilgendorf
*Assistant Examiner* — Alexander Connor Larkin Bost
(74) *Attorney, Agent, or Firm* — Studebaker & Brackett PC

(57) ABSTRACT

A vehicle system comprises a brake system comprising a brake pedal and a braking mechanism configured to apply a braking force to a vehicle, and a vehicle control unit operable to automatically stop an engine when the vehicle is decelerated to a given vehicle speed or less during traveling. When it is detected that the brake pedal is manipulated and the vehicle is stopped after automatically stopping the engine, the vehicle control unit is operable to control the braking mechanism to increase the braking force from a current value according to a manipulation amount of the brake pedal up to a given value.

7 Claims, 5 Drawing Sheets

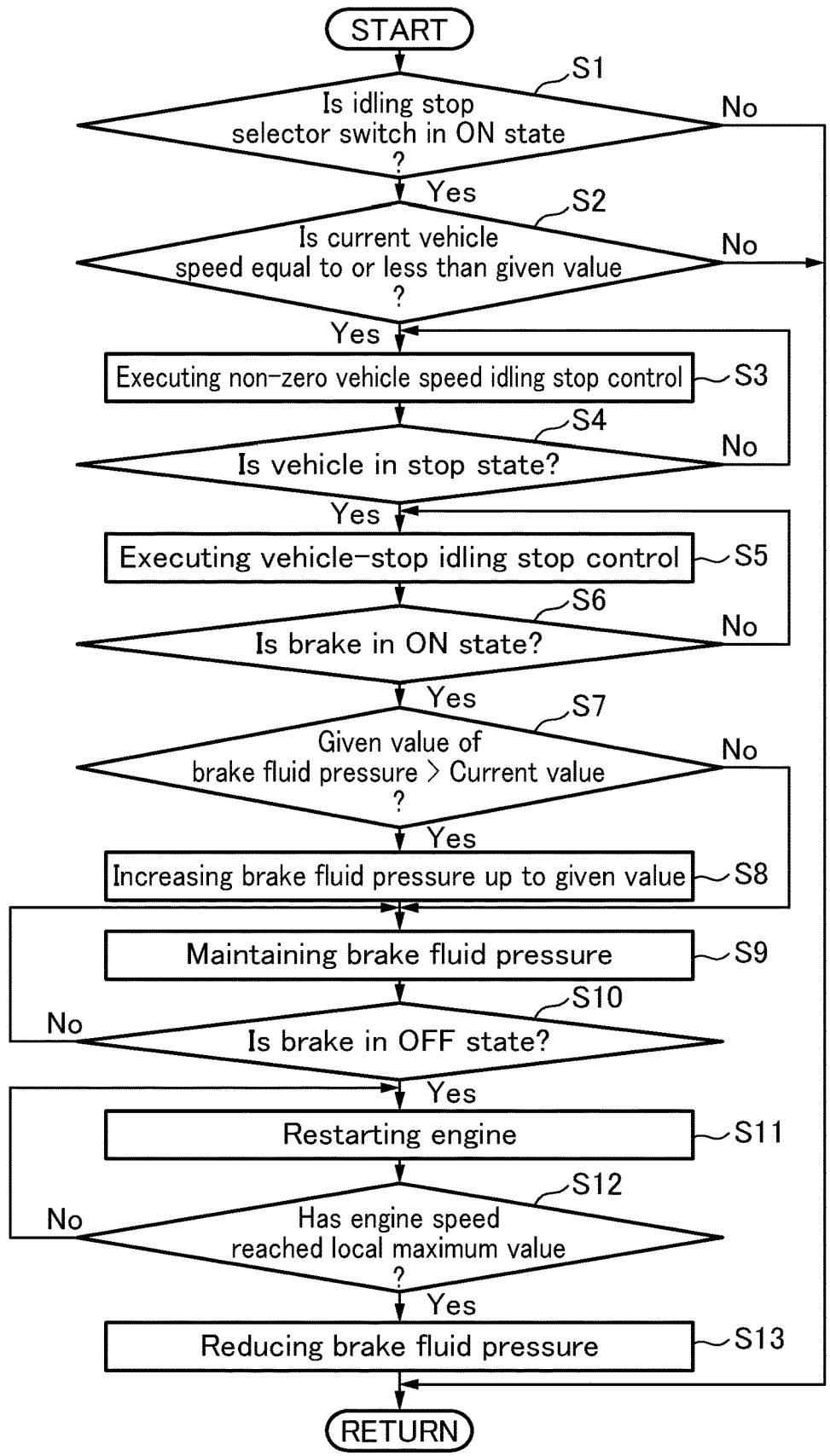

VEHICLE SYSTEM

TECHNICAL FIELD

The present invention relates to a vehicle system, and more particularly to a vehicle system comprising a braking mechanism configured to apply a braking force to a vehicle and a vehicle control unit operable to automatically stop an engine when the vehicle is decelerated to a given vehicle speed or less during traveling.

BACKGROUND ART

Heretofore, there has been known vehicle-stop (zero vehicle speed) idling stop control for automatically stopping an engine during stop of a vehicle. The vehicle-stop idling stop control is configured to automatically stop the engine, upon satisfaction of a start condition that a driver depresses a brake pedal by a given amount or more after the vehicle is stopped. The vehicle-stop idling stop control is further configured to automatically restart the engine, upon satisfaction of a termination condition that the driver releases the brake pedal during execution of the vehicle-stop idling stop control. In this situation, a brake fluid pressure is increased when the driver depresses the brake pedal by the given amount or more at start of the control, and the increased brake fluid pressure will be maintained constant until after the restart of the engine. This restrains the vehicle from starting moving due to a creep force arising from the restart of the engine.

Further, there has been known non-zero vehicle speed idling stop control for automatically stopping an engine during traveling of a vehicle. The non-zero vehicle speed idling stop control is configured to automatically stop the engine, upon satisfaction of a start condition that the vehicle is decelerated to a given vehicle speed or less, before the vehicle is stopped. The non-zero vehicle speed idling stop makes it possible to suppress fuel consumption to improve fuel economy as compared to the vehicle-stop idling stop control (see, for example, the following Patent Document 1).

CITATION LIST

Patent Document

Patent Document 1: JP 2012-46182A

SUMMARY OF INVENTION

Technical Problem

However, because the non-zero vehicle speed idling stop control is started during traveling of the vehicle, a driver is hard to depress the brake pedal by the given amount or more as in the vehicle-stop idling stop control. That is, it is impossible to depress the brake pedal such that the brake fluid pressure is increased up to a value enabling the vehicle to be restrained from starting moving due to a creep force. This leads to a problem that the vehicle is likely to start moving forwardly despite driver's intention, due to a creep force arising from restart of the engine after termination of the non-zero vehicle speed idling stop control.

It is therefore an object of the present invention to provide a vehicle system capable of preventing a situation where a vehicle starts moving forwardly despite driver's intention, due to a creep force arising from restart of an engine after executing idling stop control for automatically stopping the engine during traveling of the vehicle, to thereby improve fuel economy and safety.

Solution to Technical Problem

In order to solve the above problem, the present invention provides a vehicle system which comprises: a brake system comprising a brake pedal, and a braking mechanism configured to apply a braking force to a vehicle; and a vehicle control unit operable to automatically stop an engine when the vehicle is decelerated to a given vehicle speed or less during traveling, wherein when it is detected that the brake pedal is manipulated and the vehicle is stopped after automatically stopping the engine, the vehicle control unit is operable to control the braking mechanism to increase the braking force from a current value according to a manipulation amount of the brake pedal up to a given value.

In the vehicle system of the present invention having the above feature, when it is detected that the brake pedal is manipulated after automatically stopping the engine, the vehicle control unit operates to increase the braking force from a current value according to a manipulation amount of the brake pedal up to a given value, so that it becomes possible to prevent a situation where the vehicle starts moving despite driver's intention, due to a creep force arising from restart of the engine. Further, when it is detected that the brake pedal of the brake system is manipulated and the vehicle is stopped, the vehicle control unit operates to increase the braking force, so that it becomes possible to prevent a situation where the vehicle being in a traveling state suddenly stops despite driver's intention. Therefore, it becomes possible to improve fuel economy and safety.

Preferably, in the vehicle system of the present invention, the given value of the braking force is set to a level enabling the vehicle to be restrained from starting moving due to an increase in engine speed after restart of the engine. According to this feature, it becomes possible to reliably prevent the situation where the vehicle starts moving due to a creep force arising from restart of the engine.

Preferably, in the vehicle system of the present invention, the vehicle control unit is operable to control the braking mechanism to gradually increase the braking force from the current value up to the given value. According to this feature, the braking force is gradually applied to the vehicle being in a stop state, so that it becomes possible to prevent a situation where the vehicle undergoes vibration due to a rapid increase in braking force.

Preferably, in the vehicle system of the present invention, the vehicle control unit is operable to prohibit the increase of the braking force from the current value when the current value is equal to or greater than the given value. According to this feature, it becomes possible to prevent a situation where an excessive braking force is applied to the vehicle, causing a delay in starting of the vehicle.

Preferably, in the vehicle system of the present invention, the vehicle control unit is operable to control the braking mechanism to maintain the braking force at the given value until engine speed reaches a maximum value during an increase in engine speed after restarting the engine. According to this feature, the braking force maintained at the given value is released when the engine speed reaches the maximum value, so that it becomes possible to reliably prevent the situation where the vehicle starts moving due to a creep force arising from restart of the engine.

Preferably, in the above vehicle system, the vehicle control unit is operable to control the braking mechanism to gradually reduce the braking force after the engine speed reaches the maximum value. According to this feature, it becomes possible to prevent sudden starting of the vehicle so as to enable the vehicle to smoothly start moving.

Preferably, in the vehicle system of the present invention, the braking mechanism comprises: a hydraulic passage filled with brake fluid; an actuator coupled to an upstream side of the hydraulic passage and configured to increase a brake fluid pressure in the hydraulic passage; and a wheel brake device coupled to a downstream side of the hydraulic passage and configured to apply a braking force to the vehicle according to the increased brake fluid pressure, wherein the vehicle control unit is operable to drive the actuator based on a detection signal from a brake sensor for detecting the manipulation amount of the brake pedal, to thereby control the brake fluid pressure in the hydraulic passage. According to this feature, the vehicle control unit operates to control the wheel brake device while separating manipulation of the brake pedal by a driver and actuation of the wheel brake device, so that it becomes possible to apply the braking force to the vehicle, irrespective of the manipulation by the driver.

Effect of Invention

The vehicle system of the present invention is capable of preventing the situation where the vehicle starts moving forwardly despite driver's intention, due to a creep force arising from restart of the engine after executing idling stop control for automatically stopping the engine during traveling of the vehicle, to thereby improve fuel economy and safety.

BRIEF DESCRIPTION OF DRAWINGS

FIG. 5 is a flowchart of non-zero vehicle speed idling stop control, vehicle-stop idling stop control, and braking force-increasing control in the vehicle system according to this embodiment.

DESCRIPTION OF EMBODIMENTS

With reference to the accompanying drawings, the present invention will now be described based on one embodiment thereof.

Figure 1:
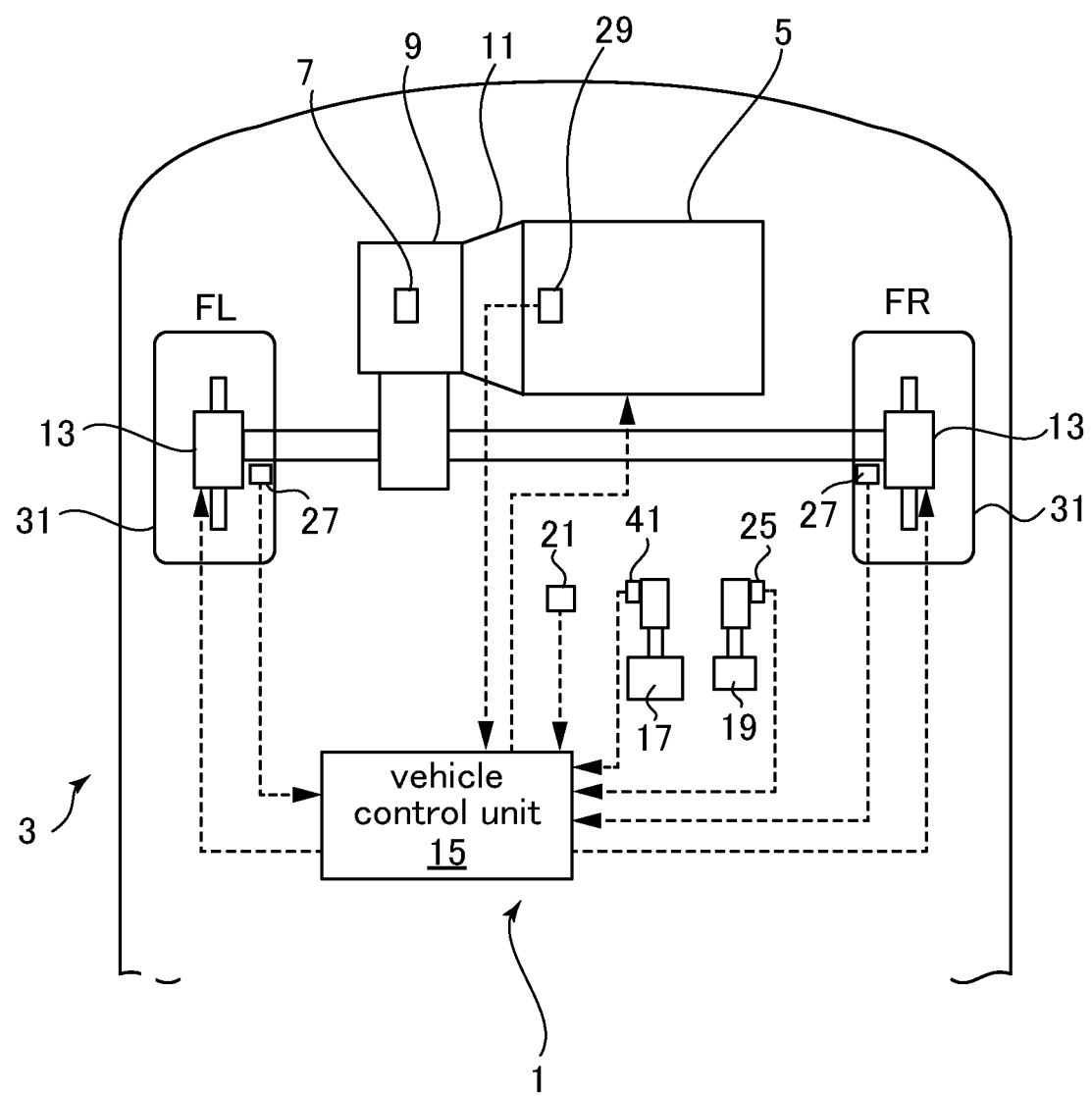
FIG. 1 is a schematic top plan view of a front region of a vehicle equipped with a vehicle system according to one embodiment of the present invention.

First of all, with reference to FIG. 1, an overall configuration of a vehicle equipped with a vehicle system according to this embodiment. FIG. 1 is a schematic top plan view of a front region of the vehicle equipped with the vehicle system according to this embodiment.

As depicted in FIG. 1, the vehicle system 1 comprises an engine (internal combustion engine) 5, a torque converter 11, an automatic transmission (AT) 9, a braking mechanism 13, a vehicle control unit 15, various manipulation parts, and various sensors. The various manipulation parts include an accelerator pedal 19, a brake pedal 17 and an idling stop selector switch 21, and the various sensors include an accelerator pedal position sensor 25, a brake stroke sensor 41, a road wheel speed sensor 27, and an engine speed sensor 29.

The vehicle 3 is a so-called AT car equipped with a torque converter-type automatic transmission 9. A torque converter 11 of the automatic transmission 9 is internally filled with liquid (oil), and configured to couple the engine 5 and a speed-change mechanism of automatic transmission 9 together via the liquid. In the automatic transmission 9, the torque converter 11 comprises a clutch mechanism 7 configured to selectively transmit and cut off a driving force, and the speed-change mechanism is configured to automatically change a gear ratio according to vehicle speed and engine speed.

Figure 2:
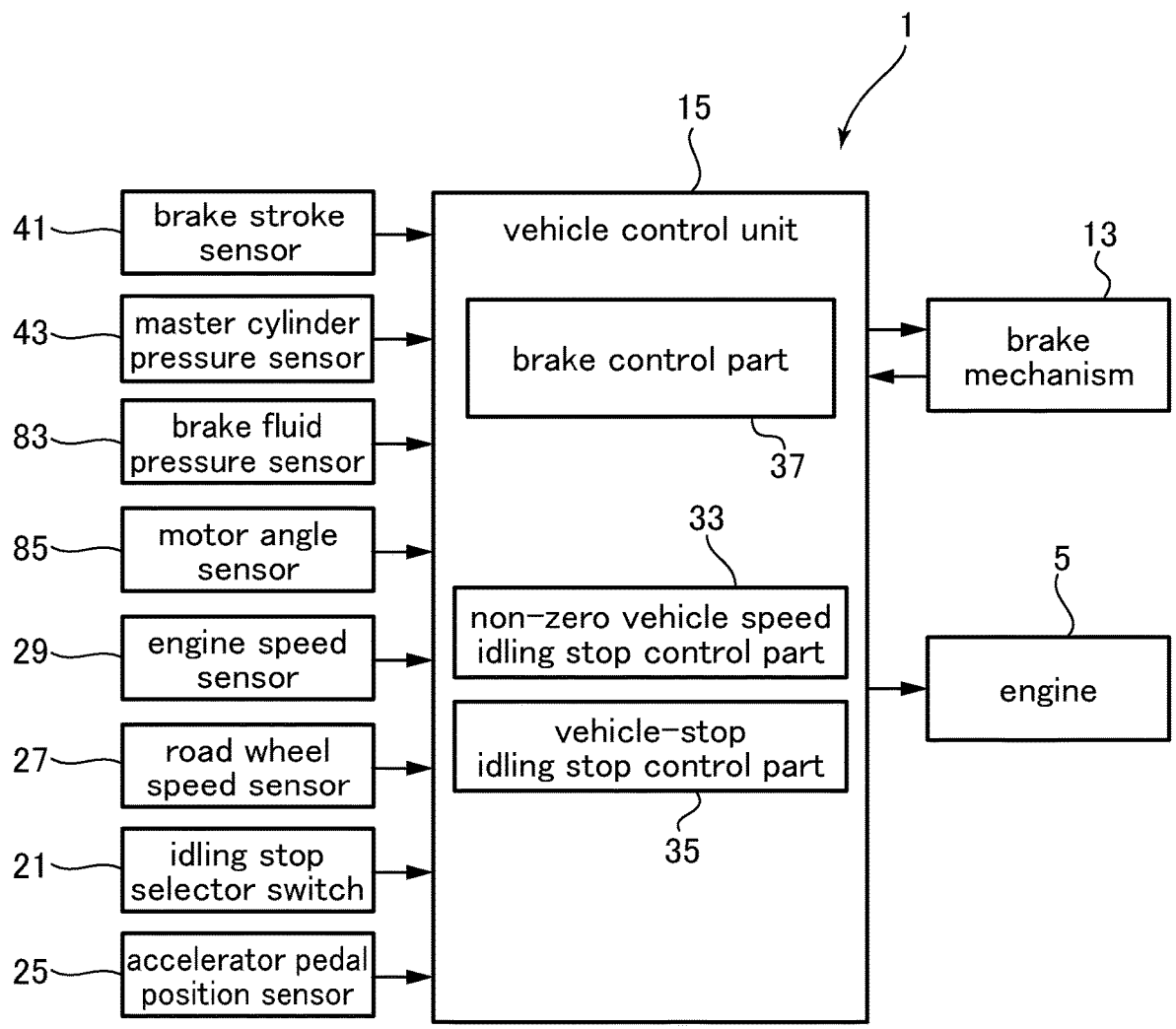
FIG. 2 is a block diagram of the vehicle system according to this embodiment.
Figure 3:
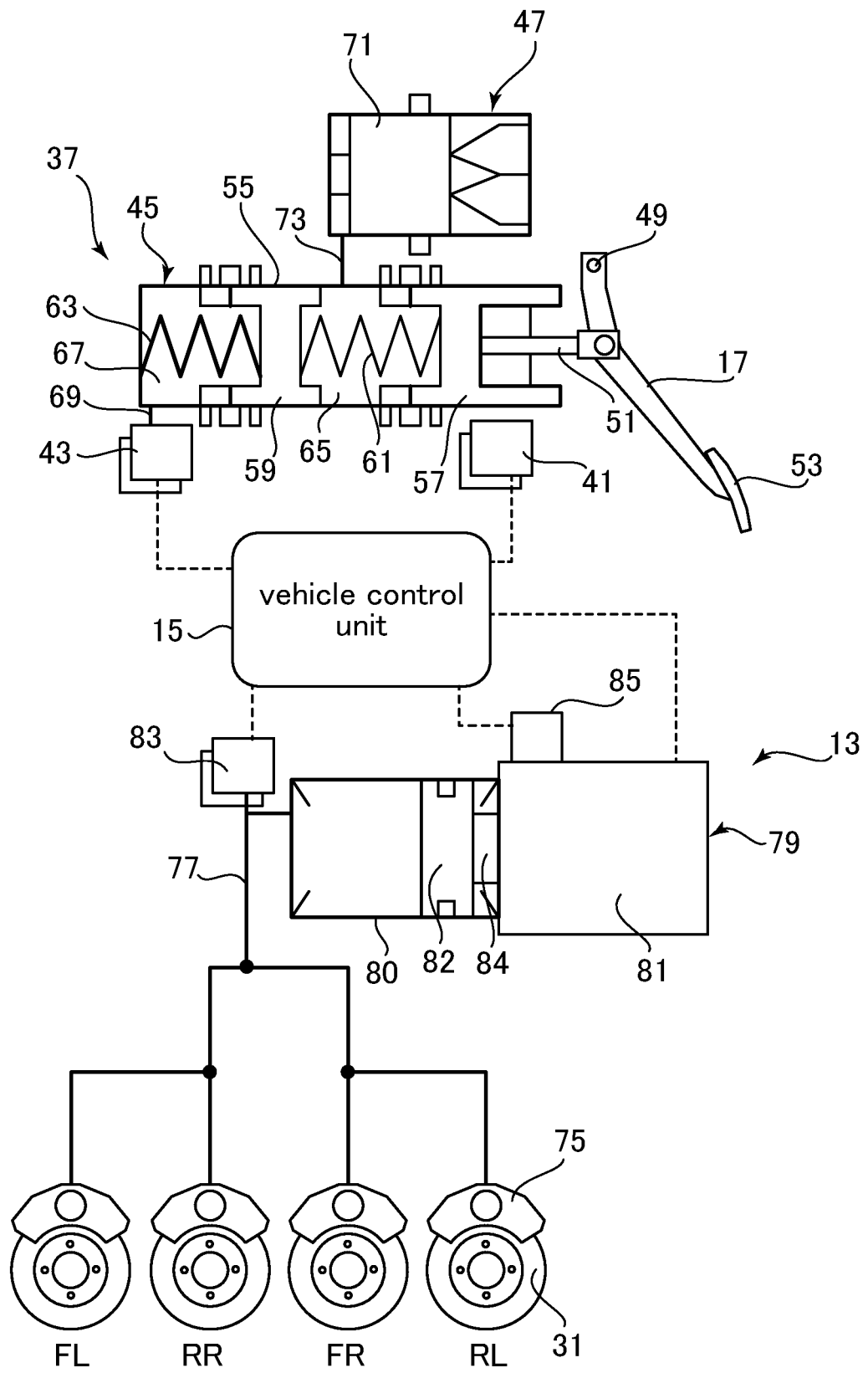
FIG. 3 is a schematic configuration diagram of a brake system in the vehicle system according to this embodiment.

Next, the configuration of the vehicle system 1 according to this embodiment will be described. FIG. 2 is a block diagram of the vehicle system 1, and FIG. 3 is a schematic configuration diagram of a brake system of the vehicle system 1.

The vehicle control unit 15 is composed of an ECU (Electronic Control Unit) and/or a DSC (Dynamic Stability Control) unit which is/are operable to combine, calculate and store signals from various devices, and perform processing of issuing a request to each of the devices. More specifically, the vehicle control unit 15 comprises: an input interface circuit for inputting therethrough signals from various devices; an output interface circuit for outputting therethrough a request signal to each of the devices; a CPU for processing the input signals; a memory; and a program for operating these components (although they are not depicted). The vehicle control unit 15 is communicably connected to the idling stop selector switch 21, various sensors, the braking mechanism 13, the engine 5 and others, and operable, based on signals from the idling stop selector switch 21 and the various sensors, to control the braking mechanism 13 and the engine 5. Based on operations of the built-in CPU and the like, the vehicle control unit 15 functions as a brake control part 37, a non-zero vehicle speed idling stop control part 33 and a vehicle-stop idling stop control part 35.

[Idling Stop System]

With reference to FIG. 2, an idling stop system in this embodiment will be described. The idling stop system comprises the road wheel speed sensor 27, the idling stop selector switch 21, the accelerator pedal position sensor 25, the brake stroke sensor 41, the non-zero vehicle speed idling stop control part 33, the vehicle-stop idling stop control part 35, and the engine 5, wherein the idling stop system functions as a means to execute the non-zero vehicle speed idling stop control and the vehicle-stop idling stop control.

The road wheel speed sensor 27 (vehicle speed sensor) is attached to each of four road wheels 31 and configured to detect a current rotational speed of a corresponding one of the road wheels 31. Each of the road wheel speed sensors 27 is operable to transmit a resulting detection signal indicative of the rotational speed of the corresponding one of the road wheels 31 to the vehicle control unit 15.

The idling stop selector switch 21 is provided on a steering wheel or a dash panel (not depicted), and configured to detect turn-on/turn-off of the switch 21 by manipulation of a driver and transmit a resulting detection signal indicative of ON state/OFF state of the switch 21 to the vehicle control unit 15. The ON state of the idling stop selector switch 21 means a state in which the non-zero vehicle speed idling stop control and the vehicle-stop idling stop control can be executed. On the other hand, the OFF state of the idling stop selector switch 21 means a state in which execution of both of the non-zero vehicle speed idling stop control and the vehicle-stop idling stop control is prohibited.

The accelerator pedal position sensor 25 is installed in association with the accelerator pedal 19 provided in the vicinity of a driver's seat of the vehicle 3, and configured to detect the presence or absence of depression of the accelerator pedal 19 by a driver, and a stroke amount (difference in position) of the accelerator pedal 19 (amount of the depression), and transmit a resulting detection signal indicative of the presence or absence of the depression and the stroke amount, to the vehicle control unit 15.

The non-zero vehicle speed idling stop control part 33 is operable, when the vehicle 3 is traveling at a low vehicle speed t of a given value or less (e.g., 20 km/h≥t>0 km/h), to execute control (non-zero vehicle speed idling stop control) of automatically stopping the engine 5. Specifically, the non-zero vehicle speed idling stop control part 33 is operable to transmit, to the engine 5, a request signal for requesting stop of fuel supply (fuel cut-off), and transmit, to the automatic transmission 9, a request signal for requesting disengagement of the clutch mechanism 7.

When the vehicle 3 is in a stop state (vehicle speed: 0 km/h), the vehicle-stop idling stop control part 35 is operable to execute control (vehicle-stop idling stop control) of automatically stopping the engine 5 of the vehicle 3. Specifically, the vehicle-stop idling stop control part 35 is operable to transmit, to the engine 5, a request signal for requesting stop of fuel supply (fuel cut-off), so as to automatically stop the engine 5. Further, the vehicle-stop idling stop control part 35 is operable to transmit, to the engine 5, a request signal for requesting execution of fuel supply by an aftermentioned fuel injection valve and spark ignition by an aftermentioned spark plug, so as to restart the engine 5.

The engine 5 has the same structure as that of a heretofore-known engine, i.e., comprises a fuel injection value for supplying fuel into each cylinder of the engine; a spark plug for performing spark ignition to start the engine 5, an intake valve for allowing intake air to be introduced into each cylinder of the engine, and an exhaust valve for allowing exhaust gas to be discharged outside each cylinder of the engine.

[Brake System]

With reference to FIGS. 2 and 3, a brake system in this embodiment will be described.

The brake system comprises the brake pedal 17, a master cylinder device 45, a reaction force generation device 47, the braking mechanism 13, the brake control part 37 (vehicle control unit 15), and various sensors. The various sensors include the brake stroke sensor 41, a master cylinder pressure sensor 43, a brake fluid pressure sensor 83, a motor angle sensor 85, and the engine speed sensor 29. The brake system has a braking force-increasing control function serving as a device for increasing the brake fluid pressure in the braking mechanism 13.

In the brake system, the brake pedal 17 and the braking mechanism 13 are not mechanically coupled to each other (i.e., manipulation of the brake pedal 17 by a driver and actuation of the braking mechanism 13 are separated from each other). The brake system is constructed as a so-called brake-by-wire system in which the brake control part 37 (vehicle control unit 15) electrically controls the braking mechanism 13.

The brake pedal 17 is provided in the vicinity of the driver's seat, and swingably attached to a support shaft 49 extending in a vehicle width direction. The brake pedal 17 is mechanically coupled to an aftermentioned first piston 57 of the master cylinder device 45 via a push rod 51. When a driver depresses a pedal pad 53 of the brake pedal 17 by his/her foot, the brake pedal 17 is swung about the support shaft 49, and the push rod 51 is linearly moved to coaxially move the aftermentioned first piston 57.

The brake stroke sensor 41 (brake sensor) is provided around the push rod 51 coupled to the brake pedal 17, and configured to detect a stroke amount (manipulation amount), and transmit a resulting detection signal to the vehicle control unit 15. The stroke amount means a distance by which the push rod 51 is linearly moved, more specifically an axial movement distance of the push rod 51 from a released state in which a driver do not touch the brake pedal 17, to a braking state in which the driver depresses the brake pedal 17. It should be noted that, instead of providing the stroke sensor 41 around the push rod 51, the stroke sensor 41 may be provided in the vicinity of the support shaft 49 and configured to detect the stroke amount, based on a rotation amount (manipulation amount) of the brake pedal 17.

The master cylinder device 45 comprises: a tubular first cylinder 55; and a first piston 57, a second piston 59, a first spring 61 and a second spring 63 each disposed within the first cylinder 55, wherein: the first piston 57 is coupled to the push rod 51; the second piston 59 is disposed coaxially spaced apart from the first piston 57 by a given distance; the first spring 61 couples the first piston 57 and the second piston 59 together; and the second spring 63 couples the second piston 59 and a distal end of the first cylinder 55. Within the firs cylinder 55, a first pressure chamber 65 is defined between the first piston 57 and the second piston 59, and a second pressure chamber 67 is defined between the second piston 59 and the distal end of the first cylinder 55. Each of the first pressure chamber 65 and the second pressure chamber 67 is filled with brake fluid (brake oil). The master cylinder device 45 is configured to generate a fluid pressure (oil pressure) corresponding to the stroke amount (manipulation amount) as measured when a driver depresses the brake pedal 17.

The reaction force generation device 47 comprises a pressure chamber 71 filled with brake fluid, and a piston (not depicted) biased toward the pressure chamber 71 by a spring member (not depicted). The pressure chamber 71 is communicated with the first pressure chamber 65 via a second hydraulic passage 73. The reaction force generation device 47 is configured to generate a fluid pressure acting as a reaction force corresponding to the stroke amount (manipulation amount) as measured when a driver depresses the brake pedal 17, to thereby apply the reaction force corresponding to the stroke amount, to the brake pedal 17.

The master cylinder pressure sensor 43 is communicated with the second pressure chamber 67 via a first hydraulic passage 69. The master cylinder pressure sensor 43 is configured to detect a master cylinder pressure which is a fluid pressure within the second pressure chamber 67, and transmit a resulting detection signal to the vehicle control unit 15. The master cylinder pressure changes depending on the stroke amount of the brake pedal 17. Thus, the master cylinder pressure sensor 43 may be used as the brake stroke sensor (brake sensor) for detection of the stroke amount (manipulation amount) of the brake pedal 17.

The braking mechanism 13 comprises; four wheel brake devices 75 provided, respectively, in the four road wheels 31 (left front road wheel FL, right rear road wheel RR, right front road wheel FR, left rear road wheel RL); a third hydraulic passage 77, a brake actuator 79, the brake fluid pressure sensor 83, and the motor angle sensor 85.

The brake actuator 79 comprises: a tubular second cylinder 80 filled with brake fluid, a third piston 82 disposed within the second cylinder 80; a drive shaft 84 movable integrally together with the third piston 82; and a motor 81 for driving the third piston 82 and the drive shaft 84. The brake actuator 79 is configured to move the third piston 82 and the drive shaft 84 close to/away from a distal end of the second cylinder 80 according to normal rotation/reverse rotation of the motor 81, and thus shrink/expand the volume of a brake fluid receiving chamber within the second cylinder 80 to thereby increase/reduce a brake fluid pressure in the third hydraulic passage 77. The brake actuator 79 is further configured such that, upon stop of the motor 81, the third piston 82 and the drive shaft 84 are stopped at given positions to maintain the brake fluid pressure in the third hydraulic passage 77 at that time.

The motor angle sensor 85 is installed around the motor 81 and configured to detect a rotational angle of the motor, and transmit a resulting detection signal to the vehicle control unit 15.

The third hydraulic passage 77 is filled with brake fluid, and composed of: a main passage communicated with the second cylinder 80 at the distal end thereof; two sub-passages branched at a downstream end of the main passage; and four sub-sub-passages two of which are branched at a downstream end of each of the sub-passages. Downstream ends of the four sub-sub-passages are communicated with the wheel brake devices 75 provided in the four road wheels 31, respectively.

The brake fluid pressure sensor 83 is disposed on an upstream side of the third hydraulic passage 77, and configured to detect the brake fluid pressure in the third hydraulic passage 77 and transmit a resulting detection signal indicative of the detected brake fluid pressure, to the vehicle control unit 15.

Each of the wheel brake devices 75 provided in the road wheels 31 comprises: a ring-shaped brake disk rotatable together with a corresponding one of the road wheels 31; a pair of brake pads configured to clamp the brake disk from opposite sides thereof to generate a braking force; and a fourth piston movable in a direction of an rotation axis of the brake disk. The wheel brake device 75 is configured such that, when the brake fluid pressure of the third hydraulic passage 77 is increased, the fourth piston is moved in an axial direction thereof, and the brake pad is pressed against the disk to generate a braking force corresponding to the increased brake fluid pressure. The wheel brake device 75 is further configured such that, when the brake fluid pressure of the third hydraulic passage 77 is reduced, the fourth piston is moved in a direction opposite to the axial direction, and the brake pad is disengaged from the disk to release the braking force. It should be noted that each of the wheel brake devices 75 is not limited to a disk brake structure as in this embodiment, but may be a so-called brake wheel cylinder (drum brake) structure comprising a wheel cylinder and a brake shoe.

The brake control part 37 is configured to drive the brake actuator 79, based on the manipulation amount of the brake pedal 17 detected by the stroke sensor 41, and map data, to increase/reduce the brake fluid pressure in the third hydraulic passage 77. The map data is a map representing the relationship between the manipulation amount of the brake pedal 17 by a driver, and the brake fluid pressure to be generated, and preliminarily stored in the brake control part 37. The map date is created based on experiment data using a conventional hydraulic brake system (brake system in which a brake pedal and each of a plurality of wheel brake devices are directly coupled together by a hydraulic passage). Thus, the brake control part 37 operates to generate the brake fluid pressure based on the map data to have a value according to a current manipulation amount of the brake pedal 17 by a driver, so that the driver can manipulate the brake pedal with the same manipulation feeling as that in the conventional hydraulic brake system.

The brake control part 37 is further configured to drive the brake actuator 79 based on signals from the various sensors without using the map data, to increase the brake fluid pressure of the third hydraulic passage 77, irrespective of the manipulation amount of the brake pedal 17 by the driver.

The engine speed sensor 29 is provided in the engine 5, and configured to detect the engine speed of the engine 5 and transmit a resulting detection signal to the vehicle control unit 15.

Figure 4:
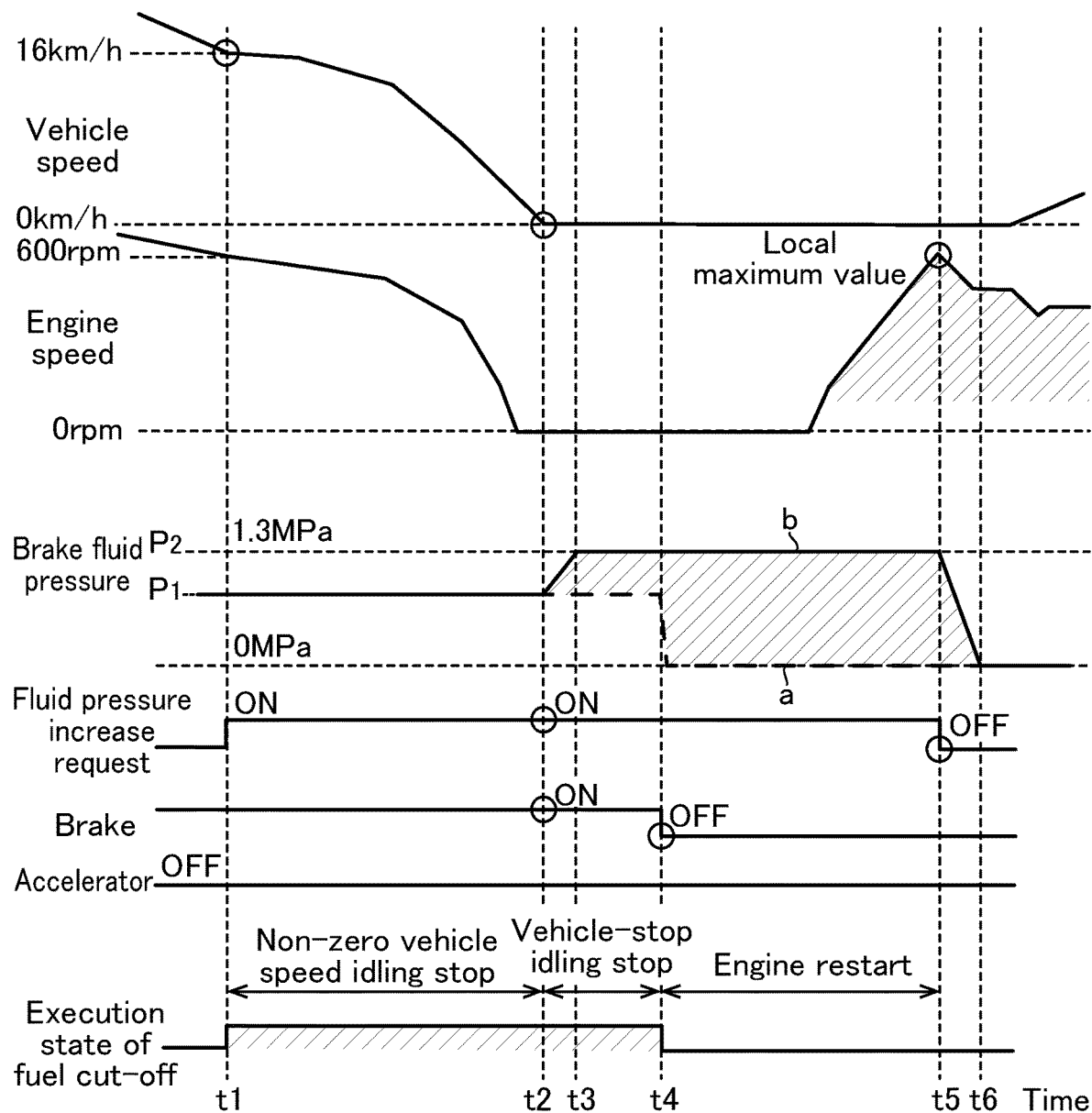
FIG. 4 is a time chart of operation of the vehicle system according to this embodiment.

Next, with reference to FIG. 4, the non-zero vehicle speed idling stop control, the vehicle-stop idling stop control, and the braking force-increasing control to be executed by the vehicle control unit 15 in this embodiment will be described. FIG. 4 is a time chart of operation of the vehicle system according to this embodiment. During traveling of the vehicle 3, the non-zero vehicle speed idling stop control, the vehicle-stop idling stop control and the braking force-increasing control are executed, respectively, in a time period from time t1 to time t2, in a time period from time t2 to time t4 and in a time period from time t2 to time t6.

Before the time t1, a driver has released the accelerator pedal 19 and has stated to manipulate the brake pedal 17. Thus, the vehicle speed is decreasing. When the vehicle speed reaches 16 km/h at the time t1, the vehicle control unit 15 starts the non-zero vehicle speed idling stop control. Specifically, the vehicle control unit 15 operates to disengage the clutch mechanism, and execute fuel cut-off for stopping fuel supply to thereby automatically stop the engine 5. At the same time as the start of the non-zero vehicle speed idling stop control, the vehicle control unit 15 operates to set, to an ON state, an on-off signal indicative of presence or absence of a fluid pressure increase request for creating a state enabling execution of the braking force-increasing control. In this embodiment, the vehicle control unit 15 is configured to set the ON/OFF state of the fluid pressure increase request. Alternatively, for example, the vehicle control unit 15 may be configured to receive an on-off signal of the fluid pressure increase request, from an engine control part provided in the engine 5, to detect the ON/OFF state of the fluid pressure increase request.

In the time period from the time t1 to the time t2, the driver maintains a constant manipulation amount (manipulation position) of the brake pedal 17, and the vehicle control unit 15 continues to execute the non-zero vehicle speed idling stop control. The vehicle control unit 15 operates to drive the brake actuator 79 of the braking mechanism 13, based on the manipulation amount of the brake pedal 17 by the driver, and the map data, to continuously generate a constant brake fluid pressure. As a result, a constant braking force is continuously applied to each of the road wheels 31, and thereby the vehicle speed is reduced over time.

At the time t2, the driver manipulates the brake pedal 17, and the vehicle 3 is stopped (the vehicle speed is 0 km/h). Further, the fluid pressure increase request is in the ON state. In response to detection of the above three execution conditions, the vehicle control unit 15 starts the braking force-increasing control. Further, in response to detection that the vehicle 3 is stopped, the vehicle control unit 15 executes the vehicle-stop idling stop control, in place of the non-zero vehicle speed idling stop control, i.e., continues to execute automatic stop of the engine 5.

Referring to FIG. 4, the broken line a and the solid line b of the brake fluid pressure in the time period from the time t2 to the time t6 denote, respectively, a characteristic line in a conventional brake system, and a characteristic line in this embodiment. In the conventional brake system (broken line a), in the time period from the time t2 to the time t4, the brake fluid pressure is generated according to the manipulation of the brake pedal 17 by the driver. When the driver releases the brake pedal 17 at the time t4, the brake fluid pressure quickly decreases and disappears (in the time period from the time t4 to the time t6).

On the other hand, in this embodiment (solid line b), in a time period from the time t2 to time t3, the vehicle control unit 15 operates to drive the brake actuator 79 to gradually increase the brake fluid pressure from a value (current value P1) according to the manipulation amount of the brake pedal 17 by the driver at the time t2, up to a given value P2, at a constant increase rate, irrespective of the manipulation amount of the brake pedal 17 by the driver. That is, the vehicle control unit 15 operates to gradually increase the braking force from a current value applied to each of the road wheels 31 at the time t2, up to a given value, at a constant increase rate. This makes it possible to increase the braking force, irrespective of the manipulation amount of the brake pedal 17 by the driver. In addition, the gradual increase of the braking force prevents the vehicle 3 in the stop state from undergoing vibration due to a rapid increase of the braking force.

In the time period from the time t3 to t4, the vehicle control unit 15 operates to stop the brake actuator 79 to maintain the brake fluid pressure at the given value P2 to thereby continuously apply the constant braking force to each of the road wheels 31. This makes it possible to maintain the braking force constant, irrespective of the manipulation amount of the brake pedal 17 by the driver.

While the driver releases the brake pedal 17 at the time t4, the vehicle control unit 15 continues to maintain the brake fluid pressure at the given value P2. Further, in response to detection of an OFF state (released state) of the brake pedal 17, the vehicle control unit 15 terminates the vehicle-stop idling stop control. Specifically, the vehicle control unit 15 operates to execute fuel supply by the fuel injection valve and spark ignition by the spark plug to thereby restart engine 5.

In a time period from the time t4 to time t5, after the elapse of a given time (with a given time lag) from restart of the engine 5, the engine speed of the engine 5 is increased. At that time, the vehicle control unit 15 operates to continue to maintain the brake fluid pressure at the given value P2 to thereby continuously apply a constant braking force to each of the road wheels 31. Further, the given value P2 of the brake fluid pressure is set to a level enabling the vehicle 3 to be restrained from starting moving due to the increase in engine speed after restart of the engine 5. In other words, the given value P2 is set to a level capable of cancelling out a torque generated along with the increase in engine speed after restart of the engine 5. This makes it possible to prevent the vehicle 3 from starting moving due to a creep force arising from the restart of the engine 5.

In the course of the increase in engine speed after the restart of the engine 5, the engine speed of the engine 5 reaches a local maximum value at the time t5. In response to detection that the engine speed reaches a local maximum value, the vehicle control unit 15 operates to set the fluid pressure increase request to the OFF state to release the maintenance of the brake fluid pressure at the given value P2. Here, the term "local maximum value" means a maximum value of the engine speed in a time region where the engine speed rapidly rises just after the restart of the engine, i.e., in a time region (t4 to t5) of so-called "engine start-up".

In a time period from the time t5 to the time t6, the vehicle control unit 15 operates to drive the brake actuator 79 to gradually reduce the brake fluid pressure at a constant decrease rate to thereby gradually reduce the braking force to be applied to each of the road wheels 31, at a constant decrease rate. This makes it possible to prevent sudden starting of the vehicle 3 and smoothly start to move the vehicle 3. Through the above processing, the braking force-increasing control is completed, and, after the time t6, a normal operation mode will be executed.

In this embodiment, a timing at which the brake fluid pressure is reduced is set to the timing (t5) at which the engine speed reaches a local maximum value. Alternatively, it may be set to any timing after the engine speed has reached the local maximum value (after the time t5).

Next, with reference to FIG. 5, a flow of the non-zero vehicle speed idling stop control, the vehicle-stop idling stop control, and the braking force-increasing control to be executed by the vehicle control unit 15 in this embodiment will be described. FIG. 5 is a flowchart of the above controls. In FIG. 5, the reference sign S denotes step.

As depicted in FIG. 5, first of all, in S1, the vehicle control unit 15 determines whether or not the idling stop selector switch 21 is set to the ON state by manipulation of a driver. When the idling stop selector switch 21 is in the ON state (S1: YES), the non-zero vehicle speed idling stop control and the vehicle-stop idling stop control is deemed to be executable. Thus, the routine proceeds to the next S2. On the other hand, when the idling stop selector switch 21 is in the OFF state (S1: NO), execution of the non-zero vehicle speed idling stop control and the vehicle-stop idling stop control is deemed to be prohibited. Thus, this routine is terminated.

Subsequently, in the S2, the vehicle control unit 15 reads current rotational speeds of the road wheels 21, from the road wheel speed sensors 27, to calculate a current vehicle speed from the read rotational speeds, and determines whether or not the current vehicle speed is equal to or less than a given vehicle speed. The given vehicle speed is preliminarily set to a relatively low value just before the vehicle 3 stops at a target position. For example, it is preferably set to 16 km/h. When the current vehicle speed is equal to or less than the given vehicle speed (S2: YES), the vehicle 3 is deemed to be in a state just before it stops at a target position, and thus the vehicle control unit 15 acts as the non-zero vehicle speed idling stop control part to execute the non-zero vehicle speed idling stop control (S3). Specifically, as the non-zero vehicle speed idling stop control, the vehicle control unit 15 executes disengagement of the clutch mechanism 7, and executes fuel cut-off to automatically stop the engine 5. On the other hand, when the current vehicle speed is greater than the given vehicle speed (S2: NO), the vehicle 3 continues to travel.

In S4, during execution of the non-zero vehicle speed idling stop control, the vehicle control unit 15 reads current rotational speeds of the road wheels 21, from the road wheel speed sensors 27, to determine whether or not the vehicle 3 is currently in the stop state (vehicle speed: 0 km/h). When the vehicle 3 is in the stop state (S4: YES), the vehicle control unit 15 acts as the vehicle-stop idling stop control part to execute the vehicle-stop idling stop control, in place of the non-zero vehicle speed idling stop control (S5). Specifically, as the vehicle-stop idling stop control, the vehicle control unit 15 executes the fuel cut-off to continue to execute the automatic stop of the engine 5. On the other hand, when the vehicle 3 is traveling (S4: NO), the vehicle control unit 15 continues to execute the non-zero vehicle speed idling stop control. In this embodiment, the vehicle system is configured to execute the vehicle-stop idling stop control separately from the non-zero vehicle speed idling stop control. Alternatively, for example, the vehicle system may be configured to integrally execute the vehicle-stop idling stop control and the non-zero vehicle speed idling stop control.

Subsequently, in S6, during execution of the vehicle-stop idling stop control, the vehicle control unit 15 reads the ON/OFF state (braking/released state) of the brake pedal 17, from the brake stroke sensor 41, to determine whether or not the brake pedal 17 is in the ON state. When the brake pedal 17 is in the ON state (S6: YES), the vehicle control unit 15 acts as the brake control part and reads a current value P1 of the brake fluid pressure in the third hydraulic passage 77, from the brake fluid pressure sensor 83, to determine whether or not the read current value P1 is less than the preliminarily-set given value P2 of the brake fluid pressure (S7). Specifically, the vehicle control unit 15 reads a current value of the braking force according to a current manipulation amount of the brake pedal 17 by the driver to determine whether or not the read current value is less than a preliminarily-set given value of the braking force. On the other hand, when the brake pedal 17 is in the OFF state (S6: NO), the vehicle control unit 15 continues to execute the vehicle-stop idling stop control.

In the S7, when the read current value P1 of the brake fluid pressure is less than the given value P2 (e.g., 1.3 MPa) (S7: YES), the vehicle control unit 15 operates to drive the brake actuator 79 to increase the brake fluid pressure in the third hydraulic passage 77 from the read current value P1 up to the given value P2 (S8). In other words, the vehicle control unit 15 operates to increase the braking force to be applied to each of the road wheels 31, from a current value according to a current manipulation amount of the brake pedal 17, up to a given value. Subsequently, in S9, during execution of the vehicle-stop idling stop control, the vehicle control unit 15 operates to stop the motor 81 to continuously maintain the brake fluid pressure at the given value P2 to thereby continuously apply a constant braking force to each of the road wheels 31.

On the other hand, in S7, when the read current value P1 of the brake fluid pressure is equal to or greater than the given value P2 (e.g., 1.3 MPa) (S7: NO), the vehicle control unit 15 operates to prohibit execution of the braking force-increasing control, without driving the motor 81, and, at the S9, maintain the brake fluid pressure in the third hydraulic passage 77 at the read current value P1 (≥P2).

Subsequently, in S10, the vehicle control unit 15 reads the ON/OFF state of the brake pedal 17, from the brake stroke sensor 41, to determine whether or not the brake pedal 17 is in the OFF state. When the brake pedal 17 is in the OFF state because the driver has released the brake pedal 17 (S10: YES), the vehicle control unit 15 operates to release the vehicle-stop idling stop control, and execute fuel supply and spark ignition to restart the engine (S11). In this case, the vehicle control unit 15 continues to maintain the given value P2 or the read current value P1 (≥P2) of the brake fluid pressure in the third hydraulic passage 77. On the other hand, when the brake pedal 17 is in the ON state (S10: NO), the vehicle control unit 15 operates to continue the vehicle-stop idling stop control. In this embodiment, whether or not the engine is restarted is determined based on the ON/OFF state of the brake pedal 17. Alternatively, for example, it may be determined based on an ON/OFF state of the accelerator pedal.

In S12, the vehicle control unit 15 reads a current engine speed, from the engine speed sensor 29, to determine whether or not the engine speed of the engine 5 has reached a local maximum value. When the engine speed has reached a local maximum value (S12: YES), the vehicle control unit 15 operates to drive the brake actuator 79 to gradually reduce the brake fluid pressure of the third hydraulic passage 77 to thereby gradually reduce the braking force to be applied to each of the road wheels 31 (S13). On the other hand, when the engine speed has not reached a local maximum value (S12: NO), the vehicle control unit 15 operates to repeatedly execute detection of the engine speed. Through the above processing, the flow of the non-zero vehicle speed idling stop control, the vehicle-stop idling stop control and the braking force-increasing control in the vehicle control unit 15 is completed.

In this embodiment, the vehicle system is configured to release the maintenance of the brake fluid pressure, based on a detection signal of the engine speed sensor. Alternatively, the vehicle system may be configured to release the maintenance of the brake fluid pressure by time control using a timer. Further, in this embodiment, the vehicle system is configured to reduce the brake fluid pressure by the brake actuator 79. Alternatively, the vehicle system is configured such that a control valve is provided at each of the branched sub-passages (or sub-sub-passages) to reduce the brake fluid pressure by the control valve.

Next, functions/advantageous effects of the above embodiment will be described.

The vehicle control unit 15 (non-zero vehicle speed idling stop control part 33) in the vehicle system 1 according to the above embodiment is operable to execute the idling stop control at a given vehicle speed or less during traveling of the vehicle to automatically stop the engine 5. When it is detected that the brake pedal 17 is manipulated and the vehicle 3 is stopped (vehicle speed: 0 km/h) after automatically stopping the engine, the vehicle control unit 15 (brake control part 37) is operable to control the braking mechanism 13 to increase the brake fluid pressure in the third hydraulic passage 77 from a current value P1 generated along with the manipulation of the brake pedal 17 by a driver up to the given value P2. In other words, the vehicle control unit 15 is operable to control the braking mechanism 13 to increase the braking force from a current value corresponding to the current value P1 of the brake fluid pressure, up to a given value corresponding to the given value P2 of the brake fluid pressure.

In the vehicle system according to the above embodiment, when it is detected that the brake pedal is manipulated after automatically stopping the engine, the vehicle control unit operates to increase the braking force to be applied to each of the road wheels 31, up to a given value, so that it becomes possible to prevent a situation where the vehicle 3 starts moving despite driver's intention, due to a creep force arising from restart of the engine. Further, when it is detected that the brake pedal 17 is manipulated and the vehicle 3 is stopped, the vehicle control unit 15 operates to increase the braking force, so that it becomes possible to prevent a situation where the vehicle 3 being in a traveling state suddenly stops despite driver's intention. Therefore, it becomes possible to improve fuel economy based on the idling stop control for automatically stop the engine during traveling of the vehicle, and prevent the vehicle from starting moving despite driver's intention to thereby improve safety.

Preferably, in the vehicle system according to the above embodiment, the given value P2 of the brake fluid pressure in the third hydraulic passage 77 is set to a level enabling the vehicle 3 to be restrained from starting moving due to a creep force arising from an increase in engine speed after restart of the engine 5. According to this feature, it becomes possible to reliably prevent the situation where the vehicle 3 starts moving due to the creep force.

Preferably, in the vehicle system according to the above embodiment, the vehicle control unit 15 is operable to control the braking mechanism 13 to gradually increase the brake fluid pressure in the third hydraulic passage 77, from the current value P1 up to the given value P2, at a constant increase rate. According to this feature, the braking force to be applied to each of the road wheels 31 is gradually increased at a constant increase rate, so that it becomes possible to prevent a situation where the vehicle 3 being in the stopped state undergoes vibration due to a rapid increase in braking force. This makes it possible to prevent a passenger from feeling uncomfortable with the vibration.

Preferably, in the vehicle system according to the above embodiment, when the current value P1 of the brake fluid pressure in the third hydraulic passage 77 is equal to or greater than the given value P2, the vehicle control unit 15 is operable to control the braking mechanism 13 prohibit the increase of the braking force from the current value P1 to the given value P2. According to this feature, it becomes possible to prevent a situation where an excessive braking force is applied to the vehicle 3, causing a delay in starting of the vehicle 3. This makes it possible to achieve smooth starting of the vehicle 3 so as to prevent a passenger from feeling uncomfortable.

Preferably, in the vehicle system according to the above embodiment, the vehicle control unit 15 is operable to control the braking mechanism 13 to maintain the brake fluid pressure in the third hydraulic passage 77 at the given value P2 to continuously apply a constant braking force to each of the road wheels 31 until engine speed reaches a maximum value during an increase in engine speed after restarting the engine 5. According to this feature, the braking force corresponding to the brake fluid pressure at the given value P2 is released when the engine speed reaches the maximum value, so that it becomes possible to reliably prevent the situation where the vehicle 3 starts moving due to the creep force.

Preferably, in the vehicle system according to the above embodiment, after the engine 5 is restarted and the engine speed reaches the maximum value, the vehicle control unit 15 is operable to control the braking mechanism 13 to gradually reduce the brake fluid pressure in the third hydraulic passage 77 from the given value P2, to thereby gradually reduce the braking force to be applied to each of the road wheels 31. According to this feature, it becomes possible to prevent sudden starting of the vehicle 3 so as to enable the vehicle 3 to smoothly start moving.

In the vehicle system according to the above embodiment, the brake system is constructed as a so-called brake-by-wire system. Specifically, the braking mechanism 13 comprises: the third hydraulic passage 77 filled with brake fluid; the brake actuator 79 coupled to an upstream side of the third hydraulic passage 77 and configured to increase the brake fluid pressure in the third hydraulic passage 77; and the wheel brake device 75 coupled to a downstream side of the third hydraulic passage 77 and configured to apply the braking force to the road wheels 31 of the vehicle 3 according to the increased brake fluid pressure, wherein the vehicle control unit 15 is operable to drive the brake actuator 79 based on a detection signal from the brake stroke sensor 41 for detecting the manipulation amount of the brake pedal 17, to thereby control the brake fluid pressure. According to this feature, the vehicle control unit 15 operates to control the wheel brake device 75 while separating manipulation of the brake pedal 17 by a driver and actuation of the wheel brake device 75, so that it becomes possible to apply the braking force to the vehicle 3, irrespective of the manipulation by the driver.

It should be noted that the present invention is not limited to the above embodiment in any way, but various changes and modifications may be made therein without departing from the spirit and scope of the present invention as set forth in appended claims.

LIST OF REFERENCE SIGNS

1: vehicle system
5: engine
13: braking mechanism
15: vehicle control unit
17: brake pedal
21: idling stop selector switch
25: accelerator pedal position sensor
27: road wheel speed sensor
29: engine speed sensor
33: non-zero vehicle speed idling stop control part
35: vehicle-stop idling stop control part
37: brake control part
41: brake stroke sensor
43: master cylinder pressure sensor
75: wheel brake device
77: third hydraulic passage
79: brake actuator
83: brake fluid pressure sensor

The invention claimed is:

1. A vehicle system comprising:
  a brake system comprising a brake pedal, and a brake configured to apply a braking force to a vehicle; and
  a vehicle controller operable to automatically stop an engine when the vehicle is decelerated to a given vehicle speed or less during traveling,
  wherein the brake pedal is manipulated, then the engine is automatically stopped during traveling when the vehicle is decelerated to the given vehicle speed or less, and then, after the engine is automatically stopped, when it is detected that the brake pedal is manipulated and the vehicle is stopped, the vehicle controller controls the brake to increase the braking force from a current value according to a manipulation amount of the brake pedal up to a given value.

2. The vehicle system as recited in claim 1, wherein the given value of the braking force is set to a level enabling the vehicle to be restrained from starting moving due to an increase in engine speed after restart of the engine.

3. The vehicle system as recited in claim 1, wherein the vehicle controller controls the brake to gradually increase the braking force from the current value up to the given value.

4. The vehicle system as recited in claim 1, wherein the vehicle controller prohibits the increase of the braking force from the current value when the current value is equal to or greater than the given value.

5. The vehicle system as recited in claim 1, wherein the vehicle controller controls the brake to maintain the braking force at the given value until engine speed reaches a maximum value during an increase in engine speed after restarting the engine.

6. The vehicle system as recited in claim 5, wherein the vehicle controller controls the brake to gradually reduce the braking force after the engine speed reaches the maximum value.

7. The vehicle system as recited claim 1, wherein the brake comprises: a hydraulic passage filled with brake fluid; an actuator coupled to an upstream side of the hydraulic passage and configured to increase a brake fluid pressure in the hydraulic passage; and a wheel brake device coupled to a downstream side of the hydraulic passage and configured to apply a braking force to the vehicle according to the increased brake fluid pressure, and wherein the vehicle controller drives the actuator based on a detection signal from a brake sensor for detecting the manipulation amount of the brake pedal, to thereby control the brake fluid pressure in the hydraulic passage.

\* \* \* \* \*